United States Patent Office 3,705,906
Patented Dec. 12, 1972

3,705,906
ADAMANTANOPYRROLIDINES
Venkatachala Lakshmi Narayanan and Joseph Edward Dolfini, North Brunswick, N.J., assignors to E. R. Squibb & Sons, Inc., New York, N.Y.
No Drawing. Filed July 24, 1968, Ser. No. 747,097
Int. Cl. C07d 27/30
U.S. Cl. 260—326.11                                4 Claims

ABSTRACT OF THE DISCLOSURE

Novel N-substituted adamantano[2,1-b]-pyrrolidines and salts thereof which are useful as antiviral agents.

---

This invention relates to novel adamantanopyrrolidines having the formula

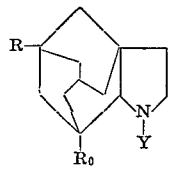

(I)

and salts thereof wherein Y represents hydrogen, an alkyl (including cycloalkyl) group containing 2 to 10 carbon atoms, allyl, —$(CH_2)_mCO_2H$ or —$(CH_2)_n$—B; $R_0$ and R each represent hydrogen, lower alkyl, lower alkoxy, or phenyl; $m$ represents 0 to 4; and $n$ represents 1 to 4.

B represents a basic, nitrogen-containing radical selected from the group consisting of

and 5- to 7-membered N-heterocyclic radicals having less than 12 atoms in the radical.

$R_1$ and $R_2$ may be the same or different and represent hydrogen, lower alkyl, or adamantyl.

Heterocyclic groups represented by B may include, for example, pyrrolidyl, piperidyl, homopiperidyl, piperazinyl, morpholinyl and thiamorpholinyl. In addition, such heterocyclics substituted by one or two groups selected from the group consisting of lower alkyl, lower alkoxy, halo and trihalomethyl are contemplated.

The terms "lower alkyl" and "lower alkoxy," as employed herein, include straight and branched chain saturated aliphatic groups of less than eight carbon atoms, such as methyl, ethyl, propyl, isopropyl, butyl, isobutyl, t-butyl, amyl, isoamyl, hexyl, heptyl, and the like. Methyl and ethyl are preferred.

Each of the four halogens (Cl, F, Br, I) are contemplated by the term "halo." Chlorine and bromine are preferred.

Salts coming within the purview of this invention include the acid addition salts, particularly the nontoxic acid addition salts, as well as quaternary ammonium salts. Acids useful for preparing the acid addition salts include organic and inorganic acids.

The inorganic acids include the hydrohalic acids (e.g., hydrochloric and hydrobromic acids) sulfuric, sulfamic, nitric and phosphoric acids. The organic acids include aliphatic monocarboxylic acids such as formic, acetic, propionic, pivalic, stearic and palmitic acids, and the like; aliphatic hydroxy monocarboxylic acids such as gluconic, glycolic and lactic acids, and the like; aliphatic lower alkoxy monocarboxylic acids such as methoxy-acetic and ethoxy-acetic acids, and the like; aliphatic lower alkanoyl monocarboxylic acids such as pyruvic acid and the like; aliphatic halogenomonocarboxylic acids such as chloroacetic, dichloroacetic, trichloroacetic and bromoacetic acids, and the like; aliphatic dicarboxylic acids such as oxalic, malonic, succinic, methylsuccinic, dimethylsuccinic, glutaric, α-methylglutaric, α,α-dimethylglutaric, β-methylglutaric, itaconic, homoitaconic, maleic, citraconic, homocitraconic, pyrocinchonic, xeronic and fumaric acids, and the like; aliphatic hydroxy dicarboxylic acids such as malic and tartaric acids, and the like; aliphatic lower alkoxy dicarboxylic acids such as α,β-dimethoxysuccinic and ethoxymaleic acids and the like; aliphatic halogeno dicarboxylic acids such as chlorosuccinic and bromosuccinic acids, and the like; aliphatic tricarboxylic acids such as aconitic and tricarballylic acids, and the like; aliphatic hydroxycarboxylic acids such as citric acid, and the like; aryl monocarboxylic or aryl aliphatic monocarboxylic acids such as benzoic, p-aminobenzoic, cinnamic, mandelic, salicylic, 4-aminosalicylic, 2-phenoxybenzoic, 2-acetoxybenzoic and nicotinic acids, and the like; theophyllineacetic acid, and the like, as well as 8-halotheophyllineacetic acids such as 8-chlorotheophyllineacetic and 8-bromotheophyllineacetic, and the like; aryl dicarboxylic acids such as phthalic and pamoic acids, and the like; amino acids such as methionine, tryptophane, lysine, arginine, aspartic, glutamic and hydroxyglutamic, and the like; organic sulfonic acids such as methane sulfonic, ethane sulfonic, benzene sulfonic, toluene sulfonic and camphor sulfonic acids and the like; hydroxy-alkane sulfonic acids such as 2-hydroxyethane sulfonic acids, and the like; organic sulfamic acids such as cyclohexane sulfamic acid, and the like, as well as ascorbic acid.

The quaternary salts coming within the purview of this invention include those formed with alkyl halides such as methyl chloride, isobutyl bromide, dodecyl chloride, cetyl iodide, and the like; benzyl halides such as benzyl chloride, and the like; and di-lower alkyl sulfates such as dimethyl sulfate, and the like. It is frequently convenient to effect the purification of the product by forming the acid salt. The free base may then be obtained therefrom by neutralization with an alkali hydroxide such as ammonium hydroxide.

The new compounds of this invention in accordance with Formula I may be prepared by the following series of reactions. In all succeeding formulas the symbols have the same meaning as set forth in connection with Formula I unless otherwise noted.

The general method for preparing compounds in accordance with Formula I involves reacting an adamantanopyrrolidine of Formula II

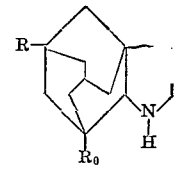

(II)

with a compound of the Formula III

   X—Y   (III)

wherein X represents halo.

Compounds in accordance with the formula

   X—Y wherein Y represents 3-pyrrolidyl may be prepared by alkylating, for instance, N-methylpyrrolidone with HO$(CH_2)_n$Br with sodium in liquid ammonia to give the corresponding 3-substituted derivative which is then subsequently reduced with lithium aluminum hydride in tetrahydrofuran and treated with PBr$_3$ to obtain the desired bromide.

Adamantanopyrrolidines of Formula II are prepared by two basically different methods, each of which involves several steps.

In the first method, 1-bromoadamantanes of Formula IV

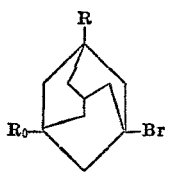

(IV)

are reacted with 1,1-dichloroethylene in the presence of sulfuric acid containing borontrifluoride to give 1-adamantane acetic acids of Formula V.

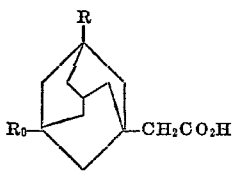

(V)

Conversion of compounds of Formula V to their corresponding acid chlorides (VI)

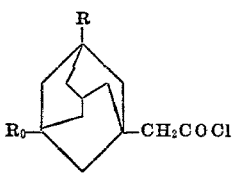

(VI)

by refluxing with excess oxalyl chloride or thionyl chloride, and subsequent treatment with strong ammonia solution yields compounds of Formula VII

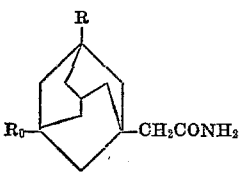

(VII)

Reduction of Compound VII with lithium hydride in an inert solvent such as tetrahydrofuran yields amines of Formula VIII

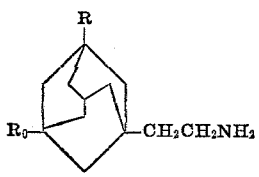

(VIII)

Compounds of Formula VIII are converted to N-lower alkyl-1-adamantaneethylamines of Formula IX (wherein $R_3$ represents lower alkyl) by standard methods.

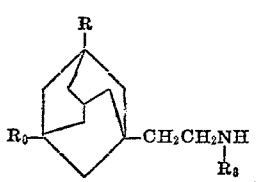

(XI)

Treatment of (IX) with N-chlorosuccinimide in an inert solvent such as ether or with "Clorox" solution yields the corresponding N-chloro-N-alkyl - 1 - adamantaneethylamines of Formula X

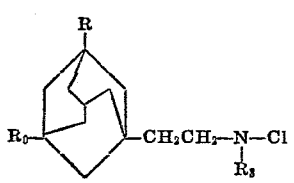

(X)

The ring closure of Formula X to yield Formula XI

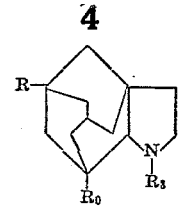

(XI)

is achieved in one of two ways:

(a) Heating (X) with 85 percent sulfuric acid at 90–110° for 1 to 3 hours and subsequent basification;

(b) Photolysis of (X) in sulfuric acid or a mixture of sulfuric and acetic acids at 0–20° for 2 to 10 hours using mercury vapor lamp. Compound XI is then dealkylated to yield (II) by treatment with cyanogen bromide in an inert solvent like chloroform or benzene.

The 1-bromoadamantane starting materials of the invention may be prepared by direct bromination of the corresponding substituted adamantanes according to the procedure of Sletter et al., Chem. Rev., 92, 1629–35 (1959).

Suitable starting materials in the preparation of compounds in accordance with Formula IV include adamantane, 1-methyladamantane, 1-ethyladamantane, 1 - butyladamantane, 1-isobutyladamantane, 1-phenyladamantane, 1-methoxyadamantane, 1-ethoxyadamantane, 1,3-dimethyladamantane, and the like.

A second method for the synthesis of adamantanopyrrolidines of Formula II involves the following steps. Compounds of Formula V are converted to the corresponding alcohols of Formula XII by treatment with lithium aluminum hydride in an inert solvent such as ether or tetrahydrofuran. Treatment of (XII) with p-toluenesulfonyl chloride in a basic medium such as pyridine yields tosylates of Formula XIII. Reaction of (XIII) with sodium or potassium azide in a solvent such as dimethylacetamide yields azide of Formula XIV. Irradiation of (XIV) with ultraviolet light then gives (II). The reaction schema is shown below.

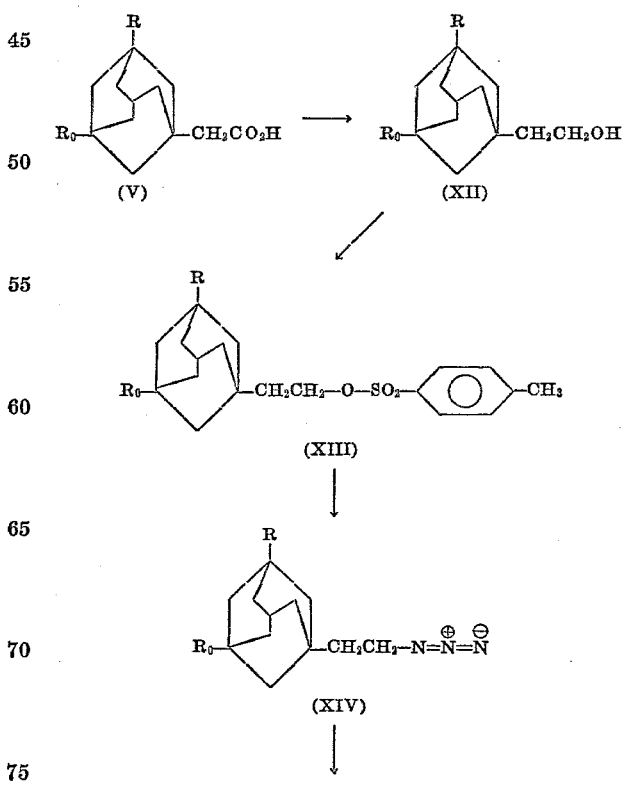

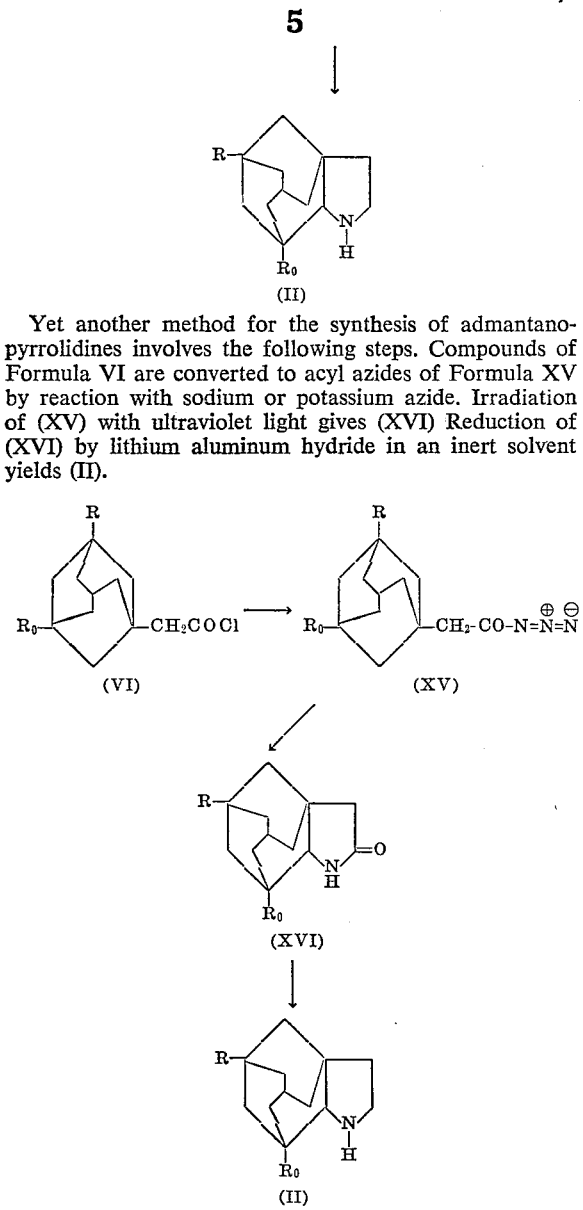

Yet another method for the synthesis of admantanopyrrolidines involves the following steps. Compounds of Formula VI are converted to acyl azides of Formula XV by reaction with sodium or potassium azide. Irradiation of (XV) with ultraviolet light gives (XVI) Reduction of (XVI) by lithium aluminum hydride in an inert solvent yields (II).

The new products of Formula I are useful as antiviral agents, e.g., against influenza virus such as A–PR8 or hepatic virus such as MHV$_3$. They may be administered to a warm blooded animal in accordance with this invention by any convenient route, including orally, or parenterally, that is, subcutaneously, intravenously, intramuscularly, or intraperitoneally. Administration can also be by vapor or spray through the mouth or nasal passages.

The dosage administered will be dependent upon the age, health and weight of the recipient, kind of concurrent treatment, if any, frequency of treatment, and the nature of the effect desired. Generally, a daily dosage of active ingredient compound will be from about 1 to 200 milligrams per kilogram of body weight, although lower, such as 0.5 milligram, or higher amounts can be used. Ordinarily, from 1 to 50, preferably 1 to 20, milligrams per kilogram per day in one or more applications per day is effective to obtain the desired result.

The active ingredient of Formula I can be employed in useful compositions according to the present invention by incorporating the free base or a physiologically acceptable salt thereof in such dosage forms as tablets, capsules, powder packets, or liquid solutions, suspensions, or elixirs, for oral administration, or liquid solutions for parenteral use, and in certain cases, suspensions for parenteral use (except intravenous since, of course, intravenous suspensions of any material are hazardous). In such compositions, the active ingredient will ordinarily always be present in an amount of at least 0.0001 percent by weight based on the total weight of the composition and not more than 99 percent by weight.

Besides the active ingredient of Formula I, the composition will contain a solid or liquid non-toxic pharmaceutical carrier for the active ingredient. Mixtures with one or more pharmaceutically active materials can of course be used.

In one embodiment of a pharmaceutical composition of this invention, the solid carrier is a capsule which can be of the ordinary gelatin type. In another embodiment, the active ingredient is tableted with or without adjuvants. In yet another embodiment, the active ingredient is put into powder packets. In these capsules, tablets, and powders the pharmaceutical carrier will generally constitute from about 5 percent to about 95 percent and preferably from 25 percent to 90 percent by weight. These dosage forms preferably contain from about 5 to 500 milligrams of active ingredient with from about 25 to 250 milligrams most preferred.

The pharmaceutical carrier can, as previously indicated, be a sterile liquid such as water and oils, including oils of petroleum, animal, vegetable or synthetic origin, for example, peanut oil, soybean oil, mineral oil, cod liver oil, and the like. In general, water, saline and aqueous dextrose (glucose) and related sugar solutions are preferred liquid carriers, particularly for injectible solutions. Sterile injectible solutions will ordinarily contain from about 0.5 to 25 percent, and preferably about 5 to 10 percent, by weight of the active ingredient.

As mentioned above, oral administration can be in a suitable suspension or syrup, in which the active ingredient ordinarily will constitute from about 0.5 to 10 percent, and preferably about 2 to 5 percent, by weight. The pharmaceutical carrier in such composition can be a watery vehicle such as an aromatic water, a syrup or a pharmaceutical mucilage.

Suitable pharmaceutical carriers are described in Remington's Practice of Pharmacy by E. W. Martin and E. F. Cook, a well known reference text in this field.

The invention will be further illustrated in the following examples. All temperatures are in degrees centigrade unless otherwise stated:

EXAMPLE 1

N-(dimethylaminoethyl)adamantano[2,1-b]pyrrolidine (A) 1-adamantaneacetic acid

A solution of 25 g. of 1-bromoadamantane in 100 g. of dichloroethylene is added dropwise during 1.5 hours to 100 ml. of sulfuric acid (90 percent) containing 18 g. of boronitrifluoride at 8–10°. After stirring for 3 hours at 10°, crushed ice is gradually added, and the mixture diluted with water. The crude precipitate (26.5 g.) is dissolved in 10 percent sodium hydroxide solution, and the cloudy solution is extracted once with ether. The basic solution is cooled, and acidified with 5 percent hydrochloric acid. The 1-adamantaneacetic acid that precipitates is collected and dried to give 21.5 g. of white solid, M.P. 130–133°. The analytical sample crystallizes from methanol-water as long white needles, M.P. 134–136°.

Analysis.—Calcd. for $C_{12}H_{18}O_2$ (percent): C, 74.19; H, 9.34. Found (percent): C, 74.24; H, 9.84.

(B) 1-adamantaneacetic acid chloride

To 39 g. of 1-adamantaneacetic acid, 100 ml. of thionyl chloride is added with cooling and the mixture is heated under reflux for 0.5 hour. The excess of thionyl chloride is removed in vacuo, the addition of 2×50 ml. of dry benzene and evaporation serving to remove the last traces, 40.5 g. (96 percent)

$\lambda_{max.}^{Nujol}$ 5.6μ

(C) 1-adamantaneacetamide

A solution of 1-adamantaneacetic acid chloride (40 g.) dissolved in 75 ml. of dry tetrahydrofuran is added to a well-cooled aqueous ammonia solution. A white precipitate appears and the mixture is then stirred for 0.5 hour. The precipitate is filtered, washed with water to neutrality, and dried over phosphorus pentoxide in vacuo to give 36.8 g. of 1-adamantaneacetamide as white crystals, M.P. 166–168°

$\lambda_{max.}^{Nujol}$ 5.9$\mu$

(D) 1-adamantaneethylamine

To a well-stirred suspension of 20 g. of lithium aluminum hydride in 500 ml. of dry tetrahydrofuran, 35 g. of 1-adamantaneacetamide dissolved in 1000 ml. of dry tetrahydrofuran is added in portions over a period of 1.5 hours. After the addition, the reaction mixture is stirred at room temperature for 1 hour and then is refluxed with stirring for 4 hours and finally is allowed to stand overnight at room temperature. The suspension is well-cooled and 50 ml. of water is added dropwise with vigorous stirring. This is followed by the addition of 100 ml. of 10 percent sodium hydroxide solution. The organic layer is separated and the solid is extracted three times with ether. The combined organic layer is dried (MgSO$_4$) and evaporated in vacuo to give 24 g. of 1-adamantaneethylamine as a pale yellow liquid. It may be identified as its hydrochloride which separates as white crystals from methanol-ether, M.P. over 280°.

Analysis.—Calcd. for C$_{12}$H$_{21}$N·HCl (percent): C, 66.82; H, 10.29; N, 6.50. Found (percent): C, 67.53; H, 10.65; N, 6.52.

(E) N-[2-(1-adamantyl)ethyl]acetamide

To a solution of 5 g. of 1-adamantaneethylamine in 100 ml. of benzene and 2.5 g. of pyridine, 2.4 g. of acetyl chloride is added dropwise with cooling. After refluxing for 0.5 hour, the mixture is poured onto 100 ml. of cold water and the benzene layer is separated. The aqueous layer is extracted once with benzene and the combined benzene layer is washed successively with water, 5 percent sodium carbonate solution, 1 N hydrochloric acid, and water. After drying, the benzene layer is evaporated in vacuo to give a thick oil (6.1 g.). Trituration with pentane yields 5.2 g. of N-[2-(1-adamantyl)ethyl]acetamide as a white solid, M.P. 100–103°. Analytical sample is obtained by two crystallizations from ether, M.P. 114–116°.

Analysis.—Calcd. for C$_{14}$H$_{23}$NO (percent): C, 75.97; H, 10.47; N, 6.33. Found (percent): C, 75.85; H, 10.44; N, 6.25.

(F) ethyl-1-adamantaneethylamine

Using procedure (D), but substituting N-[2-(1-adamantyl)ethyl]acetamide for 1-adamantaneacetamide, N-ethyl-1-adamantaneethylamine is obtained. It may be identified as its hydrochloride, which separates as white crystals from acetonitrile, M.P. over 280°.

Analysis.—Calcd. for C$_{14}$H$_{25}$N·HCl (percent): C, 68.94; H, 10.33; N, 5.74; Cl, 14.53. Found (percent): C, 68.86; H, 10.61; N, 5.78; Cl, 14.50.

(G) N-chloro-N-ethyl-1-adamantaneethylamine

A solution of 1.0 g. of N-ethyl-1-adamantaneethylamine in 100 ml. of methylene chloride is stirred with 100 ml. of "Clorox" solution for 0.5 hour. After separating the aqueous layer, fresh "Clorox" (100 ml.) is again added and the mixture stirred for an additional 0.5 hour. The organic layer separated, washed with water and dried (MgSO$_4$). Evaporation of the solvent in vacuo gives 1.0 g. of N-chloro-N-ethyl-1-adamantaneethylamine as an oil.

(H) N-ethyladamantano[2,1-b]pyrrolidine

Method A

A solution of N-chloro-N-ethyl-1-adamantaneethylamine (1.0 g.) in 50 ml. of 85% sulfuric acid is heated slowly to 95° and maintained at 90–95° for 1 hour. The product is isolated as follows. The reaction mixture is well cooled and basified with 10 percent sodium hydroxide solution. The basic solution is heated on the steam bath for 0.5 hour and then extracted with chloroform. The residue obtained after evaporation of the chloroform layer is heated with 20 ml. of acetic anhydride for 1 hour. After cooling, the reaction mixture is diluted with water, filtered, basified and extracted with chloroform. After drying (MgSO$_4$), the chloroform is evaporated in vacuo to yield N-ethyladamantano[2,1-b]-pyrrolidine as a thick oil.

Method B

A solution of N-chloro-N-ethyl-1-adamantaneethylamine (1 g.) in 20 ml. of 2 M sulfuric acid in glacial acetic acid is irradiated for 8 hours using pyrex filtered U.V. light from a mercury vapor lamp. The isolation of product follows exactly the procedure outlined in Method A.

(I) Adamantano[2,1-b]pyrrolidine

Method A: From N-ethyladamantano[2,1-b]pyrrolidine

A solution of 2.0 g. (0.01 mole) of N-ethyladamantano[2,1-b]pyrrolidine in 20 ml. of benzene is added dropwise with stirring to a solution of 1.2 g. of cyanogen bromide in 20 ml. of benzene, and then allowed to stand overnight. The residue left after evaporation of benzene is stirred with water and the solid collected. It is refluxed with excess of hydrobromic acid for 2 hours. After removing the excess of hydrobromic acid, the solid is stirred up with water, basified and extracted with chloroform. The chloroform layer is dried and evaporated in vacuo to yield adamantano[2,1-b]pyrrolidine.

Method B: From 1-adamantaneacetic acid (1) 1-adamantaneethanol.—To a well-stirred suspension of 5 g. of lithium aluminum hydride in 200 ml. of dry ether, a solution of 15.0 g. of 1-adamantaneacetic acid in 150 ml. of ether is added dropwise at such a rate as to maintain gentle reflux (addition time 1.5 hours). The mixture is stirred overnight at room temperature. After cooling, 25 ml. of distilled water is added cautiously followed by 100 ml. of 5 N sulfuric acid and 200 ml. of ether. The ethereal layer is separated and the aqueous layer is extracted once with 150 ml. of ether. The ether layers are combined, washed with water, saturated sodium bicarbonate solution, and again with water and dried over anhydrous MgSO$_4$. Exaporation of ether gives 13.4 g. of 1-adamantaneethanol as white crystals, M.P. 73–74.5°

$\lambda_{max.}^{Nujol}$ 3.05$\mu$ (OH), 9.5$\mu$ (C=O)

(2) 1-adamantaneethanol, tosylate.—To a solution of 5.4 g. (0.03 mole) of 1-adamantaneethanol in 50 ml. of pyridine, 5.7 g. of p-toluenesulfonyl chloride is added and the mixture stirred at room temperature for 48 hours. The mixture is then heated on the steam bath for 2 hours. After cooling, the reaction mixture is poured over ice cold 5 N sulfuric acid and the precipitate is collected and crystallized from dilute acetone to give 7.1 g. of 1-adamantaneethanol, tosylate as long silky needles.

Analysis.—Calcd. for C$_{19}$H$_{26}$O$_3$S (percent): C, 68.22; H, 7.84. Found (percent): C, 68.29; H, 7.74.

(3) 2-(1-adamantane)ethyl azide.—To a solution of 3.3 g. (0.01 mole) of 1-adamantaneethanol, tosylate in 100 ml. of dimethylacetatamide, 0.6 g. of sodium azide and 5 ml. of water are added and the mixture maintained at 60–70° for 3 hours. After cooling, the reaction mixture is diluted with 300 ml. of water, and extracted with 3× 100 ml. of ether. After drying, the ether is concentrated carefully to give 1.3 g. of 2-(1-adamantane)ethyl azide $\lambda_{max.}^{Nujol}$ 4.65μ (azide)

(4) Adamantano[2,1-b]pyrrolidine.—A solution of 2.0 g. of 2-(1-adamantane)ethyl azide in 100 ml. of cyclohexane is irradiated using low pressure mercury lamp for 18 hours. The solvent is removed and the mixture of products is chromatographed over alumina to give pure adamantano[2,1-b]pyrrolidine.

Method C (1) 1-adamantylacetyl azide.—To a cooled solution of 2 g. of 1-adamantaneacetic acid chloride in 8 ml. of acetone, a solution of 8 g. of sodium azide in 20 ml. of water is added dropwise. The temperature is maintained at 15–20° during the addition. After stirring the reaction mixture for 2 hours, 50 ml. of water is added, and the mixture extracted with 2× 35 ml. of cyclohexane. The solution of the crude azide [λ max. 4.62μ (N₂)] in cyclohexane is dried (MgSO₄) and used for the next step.

(2) Adamantano[2,1-b]pyrridone.—The solution of 1-adamantylacetyl azide in cyclohexane is irradiated using a low pressure mercury lamp for 18 hours. The solvent is removed in vacuo, and the mixture of products is chromatographed over alumina to give pure adamantano[2,1-b]pyrrolidone.

(3) Adamantano[2,1 - b]pyrrolidine.—Following the procedure of (D), adamantano[2,1-b]pyrrolidone is reduced with lithium aluminum hydride in tetrahydrofuran to give adamantano[2,1-b]pyrrolidine.

(J) N-(dimehtylaminoethyl)adamantano[2,1-b] pyrrolidine

To a stirred solution of 3.4 g. (0.02 mole) of adamantano[2,1-b]pyrrolidine in 100 ml. of benzene, a solution of 15 g. (0.1 mole) of 2-(dimethylamino)ethyl bromide in 200 ml. of benzene is added dropwise. After the addition, the reaction mixture is refluxed for 6 hours. The mixture is then cooled, basified, and extracted with chloroform. Evaporation of the chloroform solution in vacuo yields N - (dimethylaminoethyl)adamantano[2,1 - b]pyrrolidine.

N-(dimethylaminoethyl)adamantano[2,1-b] pyrrolidino dihydrochloride

A solution of 0.05 mole of N-(dimethylaminoethyl) adamantano[2,1-b]pyrrodine in 50 ml. of absolute alcohol is treated with a solution of ethereal hydrochloric acid, and concentrated in vacuo. The resulting dihydrochloride is crystallized from alcohol-ether.

EXAMPLES 2–45

Following the procedure of Example 1 but substituting an equivalent amount of Compound A in step (A) for the 1-bromoadamantane and Compound B for the 2-(dimethylamino)ethyl bromide in step (J), the corresponding substituted adamantano[2,1-b]pyrrolidine is obtained.

| Example | R | R₀ | Y |
|---|---|---|---|
| 2 | CH₃ | H | (CH₂)₂—N(CH₃)₂ |
| 3 | CH₃ | CH₃ | (CH₂)₂—N(CH₃)₂ |
| 4 | C₂H₅ | H | (CH₂)₂—N(CH₃)₂ |
| 5 | OCH₃ | H | (CH₂)₂—N(CH₃)₂ |
| 6 | OC₂H₅ | OC₂H₅ | (CH₂)₂—N(CH₃)₂ |
| 7 | ⟨phenyl⟩ | H | (CH₂)₂—N(CH₃)₂ |
| 8 | H | H | (CH₂)₃—N⟨piperidino⟩ |
| 9 | H | H | (CH₂)₄—N⟨⟩N—CH₃ |
| 10 | H | H | (CH₂)₃—N⟨pyrrolidino⟩ |
| 11 | H | H | —CH₂CH=CH₂ |
| 12 | H | ⟨phenyl⟩ | —CH₂CH=CH₂ |
| 13 | H | OCH₃ | —CH₂CH=CH₂ |
| 14 | CH₃ | CH₃ | —CH₂CH=CH₂ |
| 15 | H | H | (CH₂)₂—CH₃ |
| 16 | H | C₂H₅ | (CH₂)₂—CH₃ |
| 17 | H | H | CH₂—⟨phenyl⟩ |
| 18 | CH₃ | CH₃ | CH₂—⟨phenyl⟩ |
| 19 | H | OC₂H₅ | ⟨cyclopentyl⟩ |
| 20 | H | H | (CH₂)₂—COOH |
| 21 | CH₃ | CH₃ | (CH₂)₅—COOH |
| 22 | H | H | CH₂CH₂N(C₂H₅)₂ |
| 23 | OCH₃ | CH₃ | CH₂CH₂N(C₂H₅)₂ |
| 24 | n-C₃H₇ | n-C₃H₇ | (CH₂)₃N(CH₃)₂ |

TABLE—Continued

| Example | R | R₀ | Y |
|---|---|---|---|
| 25 | H | H | $(CH_2)_3$—piperidine |
| 26 | H | CH₃ | $(CH_2)_3$—piperidine |
| 27 | CH₃ | CH₃ | $(CH_2)_4$—N-methylpiperazine |
| 28 | H | n-C₄H₉ | $(CH_2)_3$—N-methylpyrrolidine |
| 29 | H | i-C₄H₉ | $(CH_2)_4$—thiomorpholine |
| 30 | i-C₃H₇ | i-C₃H₇ | $(CH_2)_3$—morpholine |
| 31 | H | C₆H₅ | $(CH_2)_3$—N-methylpiperidine |
| 32 | H | H | $(CH_2)_3$—N-methylpiperazine |
| 33 | CH₃ | CH₃ | $(CH_2)_3$—N-methylpiperidine |
| 34 | H | n-C₄H₉ | $(CH_2)_3$—morpholine |
| 35 | H | i-C₃H₇ | $(CH_2)_3$—piperidine-OCH₃ |
| 36 | CH₃ | CH₃ | $(CH_2)_3$—piperazine-N-OC₂H₅ |
| 37 | H | C₂H₅ | $(CH_2)_4$—N-methylpiperazine |
| 38 | H | n-C₃H₇ | $(CH_2)_3$—morpholine |
| 39 | H | H | $(CH_2)_3$—N-methylpyrrolidine |
| 40 | CH₃ | CH₃ | $(CH_2)_3$—N-methylpiperidine-OCH₃ |
| 41 | H | H | $(CH_2)_3$—N-methylpiperidine-CF₃ |
| 42 | H | CH₃ | $(CH_2)_4$—N-methylthiomorpholine-Cl |

TABLE—Continued

| Example | R | R₀ | Y |
|---|---|---|---|
| 43 | i-C₃H₇ | i-C₃H₇ | 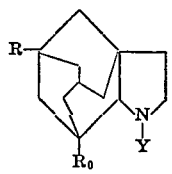 |
| 44 | H | H | (CH₂)NHCH₃ |
| 45 | H | H |  |

This invention may be variously otherwise embodied within the scope of the appended claims.

What is claimed is:

1. A compound having the formula and salts thereof wherein Y is selected from the group consisting of allyl, $-(CH_2)_mCO_2H$ and $-(CH_2)_n-B$; $R_0$ and R are each selected from the group consisting of hydrogen, lower alkyl, lower alkoxy and phenyl; $m$ is 0 to 4; $n$ is 1 to 4; B is a basic nitrogen containing radical of the structure $$-N\begin{matrix}R_1\\R_2\end{matrix}$$

and $R_1$ and $R_2$ are each selected from the group consisting of hydrogen, lower alkyl and adamantyl.

2. A compound in accordance with claim 1 wherein $R_0$ and R are both hydrogen.

3. A compound in accordance with claim 1 in which Y is di(lower alkyl)amino lower alkyl.

4. A compound in accordance with claim 1 having the name N - (dimethylaminoethyl)adamantano[2,1 - b]pyrrolidine.

References Cited

UNITED STATES PATENTS

| 3,450,761 | 6/1969 | Schneider | 260—563 |
| 3,591,642 | 7/1971 | Szinai et al. | 260—617 |

ALEX MAZEL, Primary Examiner

J. A. NARCAVAGE, Assistant Examiner

U.S. Cl. X.R.

204—158; 260—240, 243 B, 247.5 B, 253, 268 PA, 293.61, 325, 349, 456 P; 484—248, 250, 267, 274, 232

PO-1050
(5/69)

UNITED STATES PATENT OFFICE
CERTIFICATE OF CORRECTION

Patent No. 3,705,906          Dated December 12, 1972

Inventor(s) Venkatachala Lakshmi Narayanan and Joseph Edward Dolfini

It is certified that error appears in the above-identified patent and that said Letters Patent are hereby corrected as shown below:

Column 3, line 61, the number "(XI)" should read: -- (IX) --.

Column 7, line 55, the title "ethyl-1-adamantaneethylamine" should read: -- N-ethyl-1-adamantaneethylamine --.

Column 8, line 53, the word "Exaporation" should read: -- Evaporation --.

Column 10, line 5, "N-(dimehtyl" should read: -- N-(dimethyl --.

Signed and sealed this 29th day of May 1973.

(SEAL)
Attest:

EDWARD M. FLETCHER, JR.
Attesting Officer

ROBERT GOTTSCHALK
Commissioner of Patents